W. W. WILLIAMS.
DEVICE FOR TEACHING PENMANSHIP.
APPLICATION FILED JULY 6, 1914. RENEWED OCT. 23, 1915.
1,184,155.  Patented May 23, 1916.
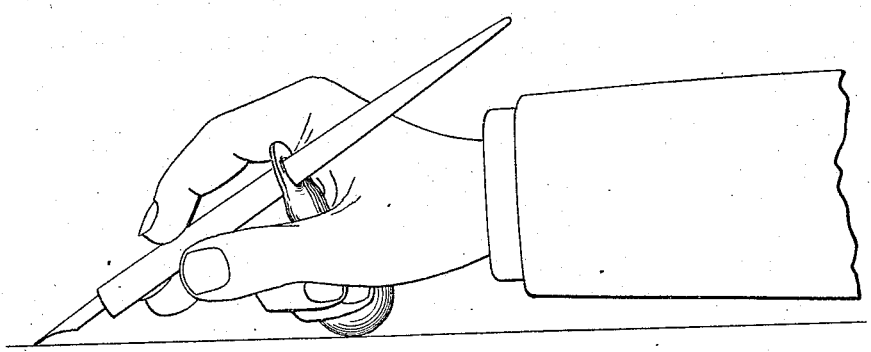
Fig. 1.
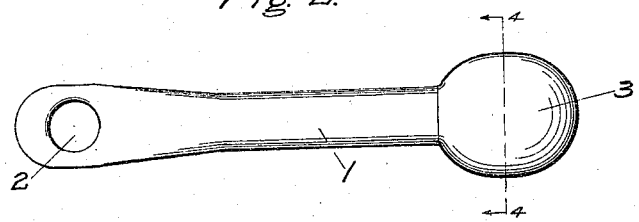
Fig. 2.
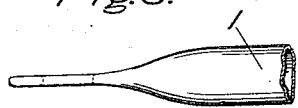 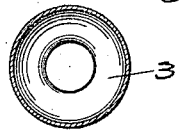
Fig. 3.  Fig. 4.
William W. Williams, Inventor

UNITED STATES PATENT OFFICE.

WILLIAM W. WILLIAMS, OF PORTLAND, OREGON.

DEVICE FOR TEACHING PENMANSHIP.

1,184,155.   Specification of Letters Patent.   Patented May 23, 1916.

Application filed July 6, 1914, Serial No. 849,064. Renewed October 23, 1915. Serial No. 57,592.

*To all whom it may concern:*

Be it known that I, WILLIAM W. WILLIAMS, a citizen of the United States, residing in the city of Portland, county of Multnomah, and State of Oregon, have invented a certain new and useful Device for Teaching Penmanship, of which the following is a specification.

My invention relates to devices for teaching penmanship, and more particularly to a device especially designed and adapted for use by pupils while writing with a pen or pencil, in order to assist them in training the hand to properly grasp the pen and to readily and necessarily assume and keep the correct writing position with the pen on the paper.

The great difficulty in teaching pupils to write properly with a pen and to use an easy and free arm movement, is to get them to hold the pen properly with the hand resting easily upon the tips of the nails of the third and fourth fingers, instead of upon the fleshy part of the hand.

The object of my invention is to provide a very simple and cheap device for use with a pen, or pencil, and adapted to be held in the hand at substantially a right angle to the pen holder or pencil and connected therewith at its upper end and at its lower end adapted to move over the supporting surface on which the writing is being done. With the device it is absolutely necessary, in order to keep the pen point on the paper, to turn the hand in the correct writing position with the third and fourth fingers turned under to substantially the same position they would occupy without the device, if properly placed.

I have shown in the accompanying sheet of drawings, one practical embodiment of the invention, and have also shown how it is used.

Figure 1 is an inner side view of the hand holding a pen with my device in use therewith; Fig. 2 is a view of the device apart from pen; Fig. 3 is a fragmentary view showing an edge of one end of the device; and Fig. 4 is a sectional view taken on line 4—4 of Fig. 2.

The invention, broadly considered, comprises in combination with a pen or pencil, a positioning member projecting laterally therefrom through the palm of the hand and preferably having its upper end adapted to fit over the pen holder so as to be readily attached and detached.

The embodiment of the invention here shown comprises a stem or body 1, having its upper end made flat and provided with a hole 2 adapted to fit the body of the pen holder or pencil, and provided at its other end with a rounded portion, or ball, as 3, whereby it can be readily moved over the supporting surface. The device is placed over the pen holder or pencil and then clasped in the hand with the pen holder in the correct writing position, as clearly illustrated in Fig. 1. The hand cannot be turned over on to the side or fleshy part thereof, as is the tendency to do, without lifting the pen point off the paper, as the lower end of the device is resting on the paper and the hand is resting on the device with the third and fourth fingers turned under in about the same position they would occupy if the hand were resting correctly thereupon.

The device, of course, is to be made of any suitable light material and its shape and size can be varied without departing from the spirit of the invention, and I do not, therefore, limit the invention to the particular form here shown for illustrative purposes, except as I may be limited by the hereto appended claims.

I claim,

1. In combination with a pen holder or pencil, a positioning member projecting laterally therefrom through the hand above the thumb with its lower end adapted to be moved upon a supporting surface.

2. In combination with a pen holder or pencil, a positioning member adapted to be clasped in the hand at substantially right angles to said pen holder or pencil at a point above the thumb and adapted at its upper end for attachment to said pen holder or pencil.

3. A device for teaching penmanship comprising a member adapted at one end to be attached to the pen holder at a point above the thumb and at its other end to be moved freely upon the supporting surface.

4. A device of the character shown and described, comprising a body portion having one end adapted to receive a pen holder therethrough, and at its other end provided with a rounded portion adapted to slide freely over a smooth surface, said device being adapted to be clasped in the hand between its ends.

5. A device for teaching pupils to hold a pen or pencil in their hand correctly, comprising a member adapted to be clasped in the hand of the pupil with a part of the fingers encircling the same, said device having one end adapted for attachment to the pen or pencil and its other end adapted to be moved over the writing surface, substantially as described.

Signed at Portland, Multnomah county, Oregon, this 29 day of June, 1914.

WILLIAM W. WILLIAMS.

In presence of—
J. J. HURLBERT,
R. B. FRENCH.